June 28, 1960  H. FAY  2,943,223
SILENT ELECTRIC DISCHARGE LIGHT SOURCE
Filed May 2, 1958
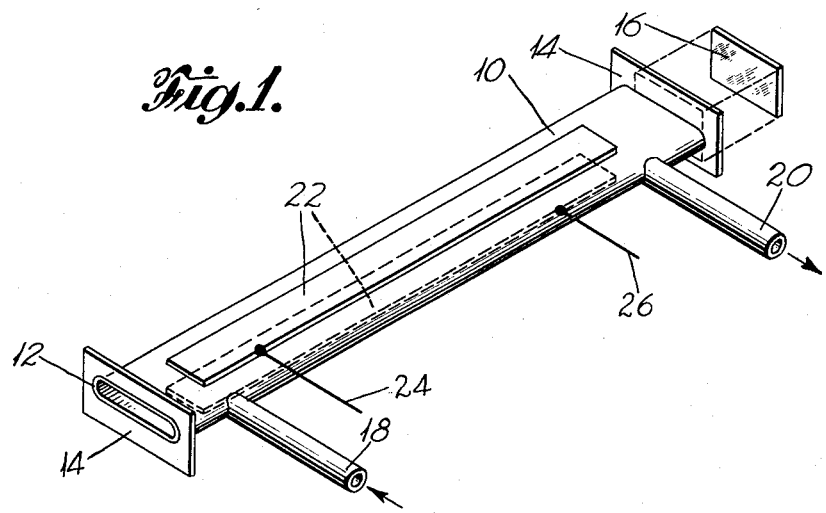
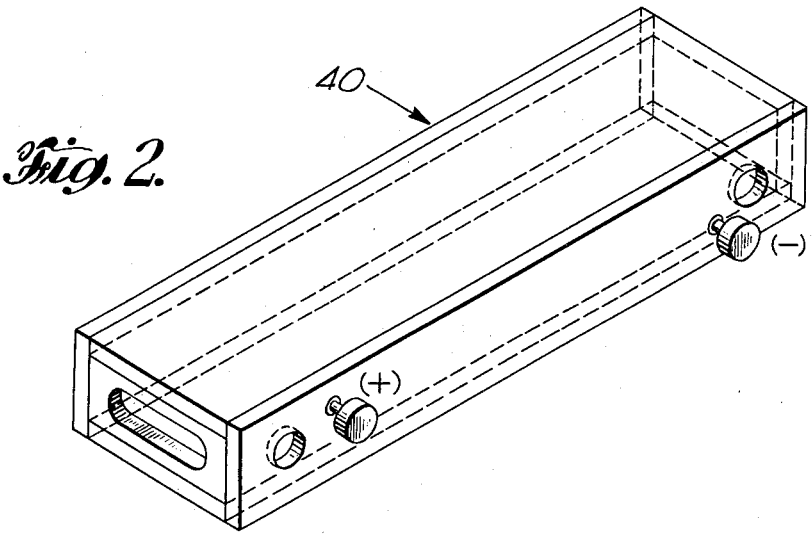
INVENTOR.
HOMER FAY
BY *William F. Mesinger*
ATTORNEY

2,943,223

SILENT ELECTRIC DISCHARGE LIGHT SOURCE

Homer Fay, Buffalo, N.Y., assignor to Union Carbide Corporation, a corporation of New York Filed May 2, 1958, Ser. No. 732,541

5 Claims. (Cl. 313—201)

This invention relates to a novel light source for use in spectroscopic analysis. More specifically it relates to a novel device for raising a gas sample to a light emissive energy level.

Briefly, emission spectroscopy is the method of analyzing a substance by raising it to an emissive energy level and observing the dispersion and character of refracted light rays emanating therefrom whereby both quantitative and qualitative measurements can be made. In modern electronically controlled devices, one or more characteristic bands can be separated and measured photometrically to automatically determine the presence of certain elements. Essentially such an instrument comprises a light source, an optical system for diffracting or retracting the rays emanating from said source, and a means to photograph or electronically measure the intensity and/or frequency of the produced spectra or individual components thereof.

The light source in such an instrument is actually the material being energized but the term includes also the particular means employed to raise a sample to be tested to said emissive level.

The optical means conventionally comprises collimating lenses to focus the light beam upon a slit through which a narrow and comparatively long beam of light is directed through a prism or onto a diffraction grating. In modern spectrometers which are set up to measure one or more specific bands, the optical system may comprise a set of optical filters capable of passing only the desired wave lengths onto the detecting means. Such a system is described in copending United States application Serial No. 714,178, of Homer Fay et al., filed February 10, 1958.

The detection means may be simply a photographic plate which records the emitted spectrum photographically so that it may be compared with other known spectra. Alternatively, the detection system may comprise an electronically operated photometric means which measures the intensity of certain bands and gives a quantitative indication. For a description of two such electronic systems reference is again made to copending application Serial No. 714,178, of Homer Fay et al.

The electric arc and electric spark are the common means of excitation used in emission spectrometry; however, these systems work only for certain materials, mostly solids. For example, the electric arc and spark are not normally used to produce emission in gases. In the past other types of spectroscopic analyses than strict emission spectroscopy have been used to analyze gas systems such as infrared and Raman spectroscopy which rely on the absorption of light energy rather than electron energization for their emissive or absorptive effects. Furthermore, many gases are not amenable to measurement by absorption spectroscopy.

A problem in the quantitative spectroscopic analysis of gas mixtures is to find an energization means which will produce usable lines for analytical purposes, i.e., a line whose intensity is proportional, within measurable limits, to the amount of emitting substance present. It has been difficult to quantitatively analyze for the impurities in air by spectrometric means. Qualitative and sometimes quantitative analyses have been successfully made with such energization means as Woods or Geissler tubes wherein a high frequency high potential discharge occurs between electrodes through the sample gas under a partial vacuum. However, a sufficient amount of gas is often adsorbed by the electrodes in such apparatus to make it unsuitable for accurate measurements. Also, the necessity of a partial vacuum for the measurement makes any continuous measurement very difficult.

The use of microwave generator or other similar high frequency, electrodeless excitation systems have been found to give usable lines even in the lower ranges; however such systems also require a partial vacuum for their successful operation with the attendant difficulty in making continuous measurements as stated above.

It is accordingly an object of this invention to provide a novel light source for an emisison spectrometer.

It is a further object to provide such an apparatus wherein gases may be analyzed under continuous flow conditions and at atmospheric pressure.

It is a still further object to provide such an apparatus wherein the sample being analyzed does not directly contact any electrode.

Other objects and advantages will be apparent from the following description and claims with reference to the drawings in which:

Figure 1 is an isometric view of the light source of the present invention, and

Figure 2 is a view of a typical insulative housing adapted to receive the device of Figure 1.

According to this invention there is provided an elongated dielectric tube having closure means on either end, one of said closure means having a transparent portion connecting with the interior of said tube, electrodes located on opposite exterior sides of said tube and extending substantially the length thereof, gas inlet and outlet means provided in said tube, and means connecting the two electrodes to a high frequency, high voltage power source.

This invention comprises a silent electric discharge device which is capable of producing useful, measurable emission from certain gases so that certain mixtures thereof can be analyzed by spectroscopic means.

A "silent electric discharge" can be produced in a gas when an alternating voltage is applied to two electrodes which enclose the gas between them and are either separated from direct contact with the gas by a solid dielectric material or in some cases, as with ozonators, are in direct contact with the gas although separated from each other by a solid dielectric boundary. They have been used in the past to promote chemical reactions and certain physical changes, but the structure of prior devices rendered the utilization or observance of any characteristic emissions from substances activated therein very difficult and impractical. Most of the prior devices for producing a silent electric discharge having complete isolation of the electrodes from the gas therein fall into one or two classes.

The coaxial capacitor design consisted of concentric cylinders of increasing radii which were respectively a first electrode, a dielectric layer, a cylindrical chamber containing the gas being exposed to the electric field, a second dielectric layer, and a second electrode. The two electrodes are connected to an alternating current source and a gaseous material passed into the cylindrical passage provided therefor.

A second silent electric discharge device is of the multiple plate capacitor design and comprises repeated stacking of planes of: an electrode 1, dielectric, gas, dielectric, electrode 2, dielectric, gas, electrode 1, etc., it being understood that all electrode 1's are attached to one terminal of an alternating current source and all electrode 2's are attached to the other terminal. While both of these devices were excellent insofar as providing a maximum exposure area for the gas to the electric field within a given volume and thus being excellent for producing chemical reactions, the efficient collection and utilization of emitted light is rendered very difficult by such structure.

Accordingly the purpose of the instant design is to produce a "silent electric discharge" tube in which a large part of the emitted light is directed in one direction and is approximately parallel light. To achieve this a 2-plate capacitor is used. The electrodes are made narrow in width (perpendicular to optic path) and long in length (parallel to optic path). Preferably both ends of the tube are closed by windows transparent to the emitted radiation and a mirror is placed at one end to reflect the radiation back through the tube and out the other end. The mirror, coupled with numerous internal reflections from the dielectric surface, enhances the intensity of the output light and results in a substantial portion of the emitted light being directed in the desired direction. The light is approximately parallel and no collimating optics are generally required. However, satisfactory results may be obtained with a transparent window at only one end.

In one embodiment of the invention a round, thin walled, glass tube is flattened on a carbon mandrel to produce a hollow rectangular tube having approximately plane parallel faces. Rectangular electrodes of conducting material (e.g., silver) are painted on, or plated on or otherwise deposited or cemented on the outside flat surfaces. Transparent windows (e.g., quartz) are cemented to each end and a front surface mirror is placed against one window. Glass tubes are connected near each end on the side of the tube and serve as gas input and exit tubes. Electrode wires are soldered or press connected to the electrodes. These wires are connected to a source of high tension alternating current such as a "Neon-sign" transformer.

A diagram of such a tube is shown in Figure 1. The tube 10 is a "Pyrex" round glass tube that has been flattened on a mandrel. Other dielectric materials may serve but glass is preferred because of its chemical inertness and dielectric breakdown properties. The tube wall 12 should be between 1 and 3 mm. in thickness to allow for mechanical strength while still behaving as a thin section of dielectric material. Similarly, the gap thickness between the inner tube walls should be between 1 and 10 mm. The proper value depends on the gas to be used, the dielectric material, and the desired thickness of the optical beam. A value of about 5 mm. is preferred when the gas to be excited is argon. If the gap is too broad, a very high voltage will be required and there is danger of rupture of the dielectric. With argon gas a voltage of 10,000 v. R.M.S. is preferred and voltages in excess of 15,000 v. R.M.S. may cause local heating and breakdown of the glass. With a voltage of 10,000 v. R.M.S. a gap of 5 mm. is very satisfactory. Somewhat higher voltages, and/or gap thicknesses, may be used with other gases, for example oxygen. The width of the tube depends on the width of the light beam desired. A value of 1 to 2 inches has been found satisfactory. The tube length is selectable for results desired. The longer the tube the more light generated and the length is usually dictated by the physical size of the space available. A length of 8 to 10 inches is satisfactory. The tube need not be as long if a mirror is employed at one end as described below. Transparent windows 14 of glass or quartz are cemented to each end of the tube with inert cement. De Khotinsky cement has been found satisfactory for use with argon. The mirror 16 is silvered or aluminized on its front surface and mounted against one of the quartz windows. The mounting of the mirror is preferably movable so that the mirror may be adjusted to obtain maximum light from the other end of the tube. The mirror reflects some of the radiation that would normally be lost, back through the tube in the desired direction. This reflection and also reflections on the inside walls of the tube increase the light output obtainable with a given tube length. The light emitted in a direction axially along the tube is intensified and is nearly collimated light. The tubes 18 and 20 are located near the ends of the discharge tube and on the thin edge of the tube. They are preferably of glass, for inertness, and fused to the discharge tube body. Either tube may be used as a gas input, the other serving as the gas exit. If the discharge tube is operated at atmospheric pressure and with gas flow rates of 5 c.f.h. or higher, the exit tube need only be a few centimeters in length and may open directly into the air with negligible back diffusion of air into the discharge tube. The electrodes 22 are formed with silver paint or by platinizing or silvering the glass surface and then copper plating. These electrodes may run substantially the length of the tube. The width of the electrodes is determined by the desired width of the light beam but the width should be less than the width of the flat portion of the glass to prevent breakdown through the air around the edges of the tube. A width of 5 to 15 mm. is satisfactory for tubes of the dimensions described. The electrode thickness should be sufficient to make the electrodes low resistance conductors. The resistance from one end of the electrode to the other should be of the order of a few ohms or less. The leads 24 and 26 are high voltage conducting wires. They may be soldered or press connected to the electrodes. They should be insulated for high (20,000 v. R.M.S.) voltage. The box 40 shown in Fig. 2 is not essential but is a convenient container for the discharge tube. Any non-conducting material may be used for its construction.

Alternatively the entire tube may be constructed of flat plate glass, wherein the rounded tube edges are replaced by a glass or other dielectric spacers. The edges are then cemented together with an inert cement. This construction is somewhat simpler but inferior to the all glass tube where gas-tightness and chemical inertness are assured. Other methods of sealing, such as fusing the edges of plate glass, would be satisfactory but are more difficult techniques of construction.

A novel light source for use in the spectroscopic analysis of certain gas systems has thus been set forth and described. This device is capable of raising certain gases to an emissive energy level at atmospheric pressure and with a continuous gas flow therethrough. It is so constructed that a usable quantity of substantially parallel light rays emanate from one end thereof which can be passed directly to suitable spectrographic analysis equipment. The device is simple and thus low in cost.

The particular embodiment of the device described is by way of illustration only, it being contemplated that modifications may be made within the spirit and scope of the invention.

What is claimed is:

1. A light source for use in the spectroscopic analysis of gases which comprises an elongated hollow dielectric member, closure means at each end of said member at least one of which is transparent at least to radiation to be measured, two elongated electrodes located on opposite exterior sides of and in surface to surface contact with said member and extending substantially the entire length thereof, gas entrance and exit means to said member, and means for connecting the two electrodes in circuit with a high voltage power source.

2. A device as set forth in claim 1 wherein said member is a glass tube of flattened cross-sectional area.

3. A device as set forth in claim 2 wherein both of said closure means are transparent and one has a mirror associated therewith exteriorly of said member, and said mirror is so disposed as to reflect light emanating from the member, back into said member and substantially parallel to the axis thereof.

4. A device as set forth in claim 2 wherein the member is constructed of pieces of plate glass secured at adjoining surfaces by a suitable inert cement.

5. A light source for use in the spectroscopic analysis of gases which comprises an elongated, hollow, flattened glass tube having closure means at either end which are transparent with respect to the wavelengths of light being measured, a mirror located on the outer surface of one of the closure means for reflecting light waves impinging thereon back through the tube and out through the other closure means, two electrodes located on opposite flattened sides of the tube exteriorly thereof and extending substantially the entire length and width of the flattened sides of the tube and in surface to surface contact therewith, and gas inlet and outlet means at either end of the tube and adjacent respective opposed ends of said electrodes entering at the side thereof providing a continuous path for a gas stream to be analyzed.

References Cited in the file of this patent

UNITED STATES PATENTS

| | | |
|---|---|---|
| 1,995,018 | Spanner | Mar. 19, 1935 |
| 2,640,870 | Seitz | June 2, 1953 |
| 2,800,622 | Lion | July 23, 1957 |
| 2,854,625 | Dudley et al. | Sept. 30, 1958 |